(12) United States Patent
Howard et al.

(10) Patent No.: US 6,888,476 B1
(45) Date of Patent: May 3, 2005

(54) CONTROL METHOD FOR VIDEO GUIDANCE SENSOR SYSTEM

(75) Inventors: Richard T. Howard, Huntsville, AL (US); Michael L. Book, Huntsville, AL (US); Thomas C. Bryan, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 18 days.

(21) Appl. No.: 10/615,369

(22) Filed: Jul. 3, 2003

(51) Int. Cl.[7] .............................................. G08B 21/00
(52) U.S. Cl. ................. 340/958; 340/932.2; 244/144 R
(58) Field of Search .............................. 340/958, 932.2, 340/945; 348/148; 244/114 R

(56) References Cited

U.S. PATENT DOCUMENTS

| | | | |
|---|---|---|---|
| 5,007,736 A | * | 4/1991 | Daniel et al. .......... 356/139.08 |
| 6,091,345 A | | 7/2000 | Howard et al. |
| 6,427,780 B1 | * | 8/2002 | Kimura ........................ 172/2 |

OTHER PUBLICATIONS

R. T. Howard, T. C. Bryan, M. L. Book, "The Video Guidance Sensor: Space, Air, Ground and Sea," GN&C Conference, p. 14, (Nov. 2, 2000).

R. T. Howard, M.L. Book, T.C. Bryan, "Video-based Sensor for Tracking 3 Dimensional Targets," Europto Conference, p. 9, (Sep. 28, 2000).

R. T. Howard, T. C. Bryan, M. L. Book, "Active Sensor System for Automatic Rendezvous and Docking," p. 10.

* cited by examiner

Primary Examiner—Julie B. Lieu
(74) Attorney, Agent, or Firm—James J. McGroary; Ross F. Hunt, Jr.

(57) ABSTRACT

A method is provided for controlling operations in a video guidance sensor system wherein images of laser output signals transmitted by the system and returned from a target are captured and processed by the system to produce data used in tracking of the target. Six modes of operation are provided as follows: (i) a reset mode; (ii) a diagnostic mode; (iii) a standby mode; (iv) an acquisition mode; (v) a tracking mode; and (vi) a spot mode wherein captured images of returned laser signals are processed to produce data for all spots found in the image. The method provides for automatic transition to the standby mode from the reset mode after integrity checks are performed and from the diagnostic mode to the reset mode after diagnostic operations are carried out. Further, acceptance of reset and diagnostic commands is permitted only when the system is in the standby mode. The method also provides for automatic transition from the acquisition mode to the tracking mode when an acceptable target is found.

7 Claims, 3 Drawing Sheets

CONTROL METHOD FOR VIDEO GUIDANCE SENSOR SYSTEM

ORIGIN OF THE INVENTION

This invention was made by employees of the United States Government and may be manufactured and used by or for the Government for governmental purposes without the payment of any royalties.

FIELD OF THE INVENTION

The present invention relates to a video guidance sensor system for space vehicles and, more particularly, relates to a software-based control method for such a system.

BACKGROUND OF THE INVENTION

Prior techniques used in determining the range between two spacecraft vehicles for automatic rendezvous and docking of such, include vehicle radar, man in loop estimates, global positioning systems, lasers, loran, and video guidance sensor systems for processing optical images in determining range. The video guidance sensor system approach, which is of particular importance here, is based on the concept of using captured and processed images to determine the relative positions and attitudes of a video guidance sensor and target.

One prior art video guidance sensor system uses a pair of lasers of predetermined wavelengths to illuminate a target. The target includes a pattern of filtered retroreflectors to reflect light. The filtered retroreflectors pass one wavelength of light and absorb the other. Two successive pictures or images are taken of the reflected light and the two images are then subtracted one from the other, thereby allowing for target spots to be easily tracked. Such a system is described, for example, in R. Howard, T. Bryan, M. Book, and J. Jackson, "*Active Sensor System for Automatic Rendezvous and Docking,*" SPIE Aerosense Conference, 1997, which is hereby incorporated by reference.

Another prior art video guidance sensor system uses a CMOS imaging chip and a digital signal processor (DSP) in order to provide higher-speed target tracking and higher-speed image processing. The high-speed tracking rates result in a more robust and flexible video guidance sensor. Because of these faster tracking rates, the video guidance sensor system can track faster moving objects or provide more data about slower moving objects. Such a system is described, for example, in R. Howard, M. Book and T. Bryan, "*Video-based sensor for tracking 3-dimensional targets,*" Atmospheric Propagation, Adaptive Systems, & Laser Radar Technology for Remote Sensing, SPIE Volume 4167, Europto Conference, September 2000, and in R. Howard, T. Bryan, and M. Book, "*The Video Guidance Sensor: Space, Air, Ground and Sea,*" GN&C Conference, 2000, which are also hereby incorporated by reference.

An improved video guidance system is described in R. Howard, T. Bryan and M. Book, "*An Advanced Sensor for Automated Docking,*" Proceedings of Digital Avionics Systems Conference (October, 2001), which is also hereby incorporated by reference. The basic components of the overall docking system include an on-board computer, control software for calculating the correct thruster firings necessary to achieve docking, a sensor for long-range (rendezvous) operations, a sensor for short range (proximity) operations, and grapple mechanism or fixture for allowing the system to be attached to the target vehicle. The video guidance sensor serves as the short range sensor and must be able to handle the transition from rendezvous to proximity operations and to pick up where the rendezvous sensor leaves off.

The improved video guidance sensor is generally based on the tracking of "spots" on known targets as explained below. By tracking only spots, a large amount of image processing/scene interpretation is avoided, and because the spots occupy known positions on the target, the sensor can easily determine relative position and attitude data based on the centroids of the spots.

The basic video guidance sensor system consists of the sensor and the target. The sensor is the active part and includes a pair of laser illuminators which illuminate the target and an image processor which processes the return images. In one preferred embodiment, the target is an arrangement of corner-cube retro-reflectors with associated optical filters.

The improved video guidance sensor currently uses lasers of two different wavelengths to illuminate the target. One of the wavelengths passes through the filters in front of the retro-reflectors on the target while the other wavelength is absorbed by the filters. The system essentially functions by taking a picture of the target illuminated by the foreground lasers and then taking a picture of the target illuminated by the background lasers. The second picture is subtracted from the first, thereby producing a very low-noise image with some bright spots at the target reflector locations. After the image subtraction, the processor (DSP) processes the resulting intensity data, essentially by assembling the pixels in the image which are above a preset threshold into "blobs." The blobs are then screened for size, the centroids of the blobs are computed and the relation between the positions of the blobs is used to determine whether there is a match between the blob pattern and the known target pattern.

Once the target "spots" are picked out of all of the blobs, tracking windows are established around the target spots and the relative positions and attitudes between the sensor and the target are computed. When the target is close enough to the sensor, tracking windows are established around each of the target spots. The acquisition cycle or mode requires processing the entire image to find the target. The use of tracking windows has the advantage that once the target has been acquired, only the area around the target spots must be processed each cycle, so that processing time is decreased.

SUMMARY OF THE INVENTION

According to the invention, a software-based control method is provided for controlling implementation of, and transitioning between, a plurality of different modes of operation of a video guidance sensor system. After the overall system software performs basic functional testing upon powerup, the software-based method of the invention checks, for correctness, allowable commands for six different modes of operation. If a particular command checks out, the commanded mode proceeds. As discussed below, an "acquire" or "acquisition" mode, wherein a target with an acceptable range is sought, and a "track" or "tracking" mode, wherein the acquired target is tracked, are the primary modes of operation for the video guidance sensor system.

In accordance with the invention, there is provided a method for controlling operations in a video guidance sensor system wherein images of laser output signals transmitted by the system and returned from a target are captured and processed by the system to produce data used in tracking of the target, the target including a predetermined pattern of light reflectors so that a captured image of the target includes a pattern of light spots corresponding to the pattern of light reflectors, the method providing for performance of each of the following modes of operation in response to a corresponding mode command:

(i) a reset mode wherein program integrity checks are performed and an output produced;

(ii) a diagnostic mode wherein diagnostic operations are carried out and a known output is obtained from a previously synthesized image;

(iii) a standby mode wherein status data is output at a fixed rate;

(iv) an acquisition mode wherein range information is included in a corresponding acquisition mode command and an attempt is made, based on captured images of returned laser signals, to find a target pattern within a range window centered around an estimated range;

(v) a tracking mode wherein images of a target pattern are captured and data relevant to that target is output; and (vi) a spot mode wherein captured images of returned laser signals are processed to produce data for all spots found in the image, and the method providing for automatic transition to the standby mode from the reset mode after the integrity checks are performed and from the diagnostic mode to the reset mode after the diagnostic operations are carried out, and the method permitting acceptance of acquisition, spot, reset and diagnostic commands only when the system is in the standby mode, and the method further providing for automatic transition from the acquisition mode to the tracking mode when an acceptable target pattern is found.

In one preferred implementation, two different rates of tracking are provided in the tracking mode, and the tracking rate to be used is determined as part of an acquisition mode command. In an alternative preferred implementation, the tracking rate to be used is determined based on a separate tracking command.

Preferably, entry into the reset mode is limited to one of (i) powering up the video guidance sensor system and (ii) the system undergoing a soft reboot.

Advantageously, in each of the modes, an output is produced which includes analog data corresponding to temperature and voltage levels of system hardware.

In one advantageous implementation, the method is carried out using two different digital signal processors. Preferably, one of the processors (the command processor) receives said mode commands from an external source, processes the commands and passes the commands to the other of the processors (the image processor) and the other of said processors carries out image processing required by some of the commands.

Further features and advantages of the present invention will be set forth in, or apparent from, the detailed description of preferred embodiments thereof which follows.

DETAILED DESCRIPTION OF THE PREFERRED EMBODIMENTS

Figure 1:
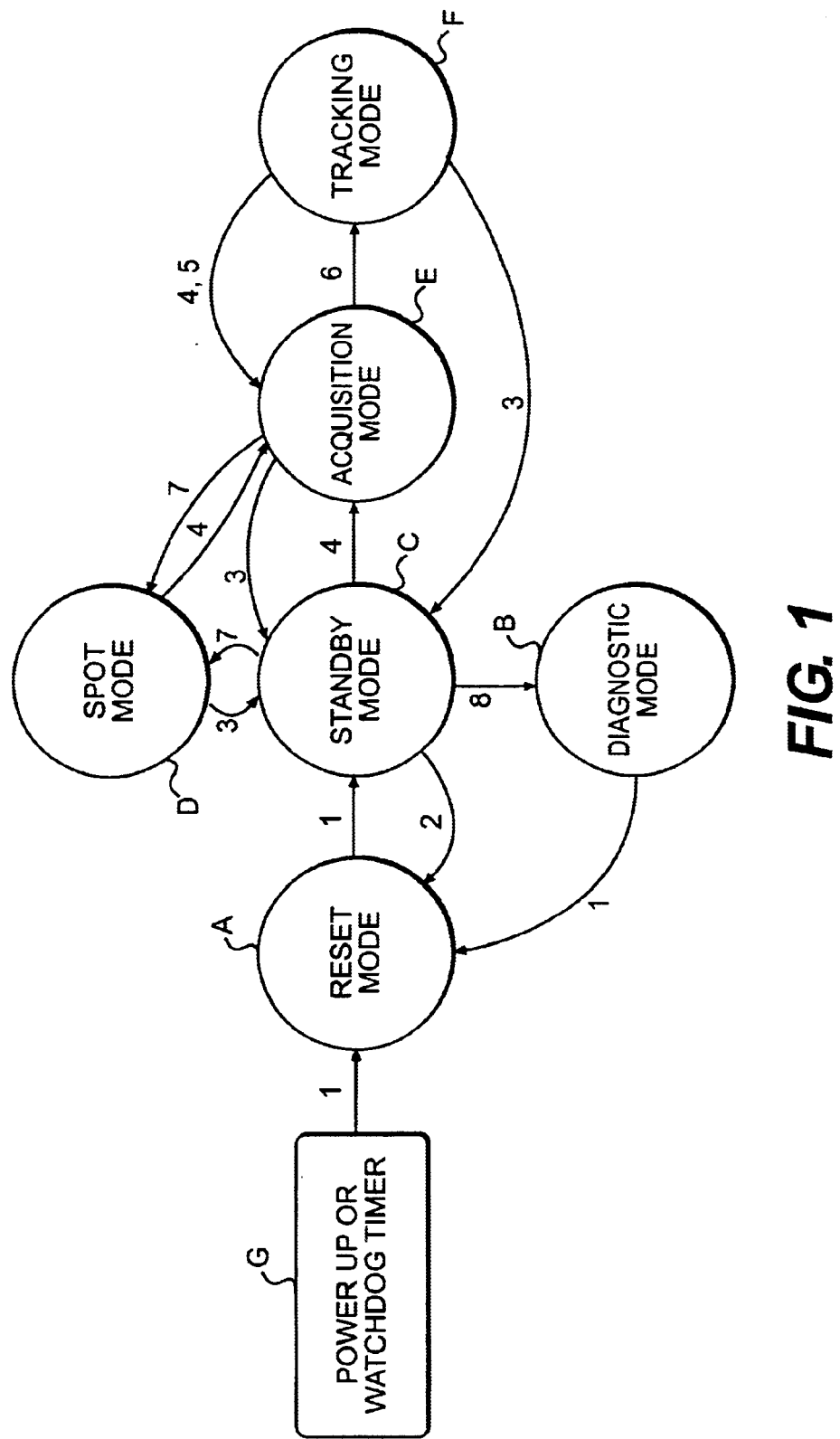
FIG. 1 is state transition diagram illustrating transition relationships between the modes of operation of the video guidance sensor system.

In general, the overall video guidance sensor software is designed to perform the communications and control for the sensor electronics hardware. In a specific implementation, the hardware includes two digital signal processors (DSPs), a Texas Instruments F240 and a TMS320VC33 (C33). The hardware also includes RAM and ROM for the two processors, two field-programmable gate arrays (FPGAs), image storage memory and camera and laser control electronics. Broadly speaking, the video guidance sensor software receives commands from an external source through a serial interface, checks the commands for correctness, implements the commands and returns the data appropriate for the command received. In the specific embodiment under consideration, the F240 processor receives and processes the commands and then passes the appropriate data to the C33 whose main function is to carry out the image processing necessary for some of the commands.

As indicated above, an important function of the software of the invention is to process commands for and to control transitioning between six different modes of operation as follows: (i) reset; (ii) diagnostic; (iii) standby; (iv) acquisition; (v) track; and (vi) reset. Of these, diagnostic and reset are one-time events, i.e., when the software is commanded to do one of these modes, the software performs the indicated action and then automatically transitions into another mode. In each of the six modes, a part of the data output in that mode includes sixteen bytes of analog data corresponding to various temperatures and voltage levels in the system hardware.

Briefly considering the various modes, in the reset mode, the software performs some basic integrity checks and outputs the integrity checks as well as the software version number. As indicated above, this is a one-time event in that after doing the above, the software automatically transitions into the standby mode. The reset mode is reached only after the entire video guidance sensor system is powered up or undergoes a soft reboot. When the system is commanded to reset, the system performs a soft reboot and comes up in the reset mode.

Turning to the diagnostics mode, when commanded to do diagnostics, the software runs two diagnostic routines which involve firing the lasers, measuring output power and firing time, processing synthesized images and producing a known output from the synthesized images. This process was generally described above. After the routines are run, the software transitions automatically into the reset mode, by rebooting the entire system.

In the standby mode, the software outputs data as to its status at a predetermined rate which is 5 Hz in an exemplary embodiment. The reset and diagnostic commands are only accepted when the system is in the standby mode.

When the system is commanded into the acquisition mode, a range estimate is included in the command. The overall software then provides for firing of the lasers, grabbing of the return images and processing of the images. Based on the processed images the software attempts to find a target pattern within a predetermined percentage of the estimated range (±30% in an exemplary implementation). This process also occurs at a predetermined rate (e.g., 5 HZ, as above) and data is output that describes those target spots, if any, that are picked up by the sensor. If an acceptable target pattern is found, the software automatically transitions into the track mode.

In the track or tracking mode, the sensor software again provides for firing the lasers, grabbing the returned images, processing the images and outputting the data relevant to the particular target. This data typically comprises range, bearing, attitude, and information about the spots. In the implementation being considered here, the sensor has two rates of tracking, viz., 5 Hz and 25 Hz. The tracking rate is given as part of the acquisition command or in a separate track command. The latter is only valid if the video guidance sensor system is already in the track mode.

In the spot mode, the software provides for firing the lasers, grabbing images, processing the images and, in this case, outputting the data for the spots found in the image. This is again done at a fixed (5 Hz) rate. This mode is especially useful because many parameters of target acquisition can be varied, something that is necessary for calibration purposes on the ground.

Referring to FIG. 1, a state transition diagram is shown for the six modes of operation. The reset, diagnostics, standby, spot, acquisition and tracking modes are indicated at A, B, C, D, E and F, respectively. A further "powerup" or "watchdog timer" mode of operation is indicated at G. A watchdog timer timeout will transition from initial "power up" to any of the other modes.

The commands or other signals are as follows: automatic, denoted 1; reset command, denoted 2; standby command, denoted 3; acquire command, denoted 4; target not found, denoted 5; target found, denoted 6; spot command, denoted 7; and diagnostic command, denoted 8.

As discussed above and is indicated in FIG. 1, the automatic transition 1 is between powerup G and reset mode A, reset mode A and standby mode C and diagnostic mode B and reset mode A. Thus, for example, as discussed hereinbefore, the reset mode A automatically transitions into the standby mode C, and the diagnostic mode B, after all routines are run, automatically transitions into the reset mode A.

The reset command 2 represents the transition between the standby mode C and the reset mode A, while the standby command 3 represents the transition to the standby mode B from the spot mode D, the tracking mode F or the acquisition mode E, indicating a return to the standby mode C when the mode operations or routines for these modes are completed.

The "acquire target" command 4 represents a transition to the acquisition mode E from the standby mode C, the spot mode D or the tracking mode F.

The "target not found" signal represents the transition from the tracking mode F to acquisition mode E when no target is found during the tracking mode while, similarly, the "target found" signal 6 represents the transition between the acquisition mode G and the tracking mode F when a target is found.

The spot command 7 represents the transition from the standby mode C or the acquisition mode E to the spot mode D.

The diagnostic command 8 represents the transition from the standby mode C to the diagnostic mode B.

Figure 2:
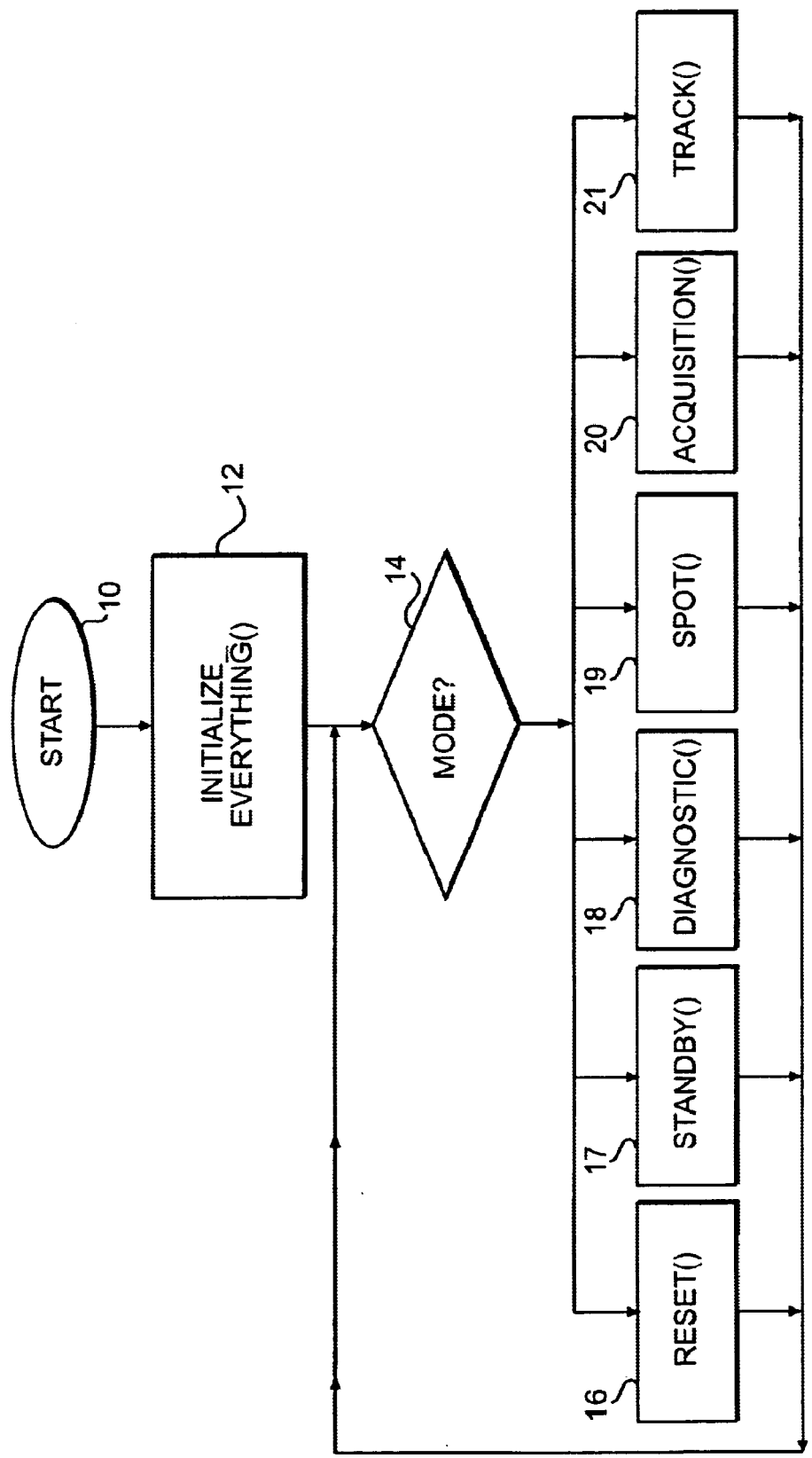
FIG. 2 is the main flow chart for the command processor of the system.

Referring to FIG. 2, the re is shown the main flow chart for the above-mentioned F240 processor. As shown, the process proceeds from start 10, to an "initialize everything" block 12 wherein the system is initialized to a "mode?" decision diamond 14 which determines the proper mode. Blocks 16 to 21 respectively represent the operations and routines for the reset, standby, diagnostic, spot, acquisition and track modes described above.

Figure 3:
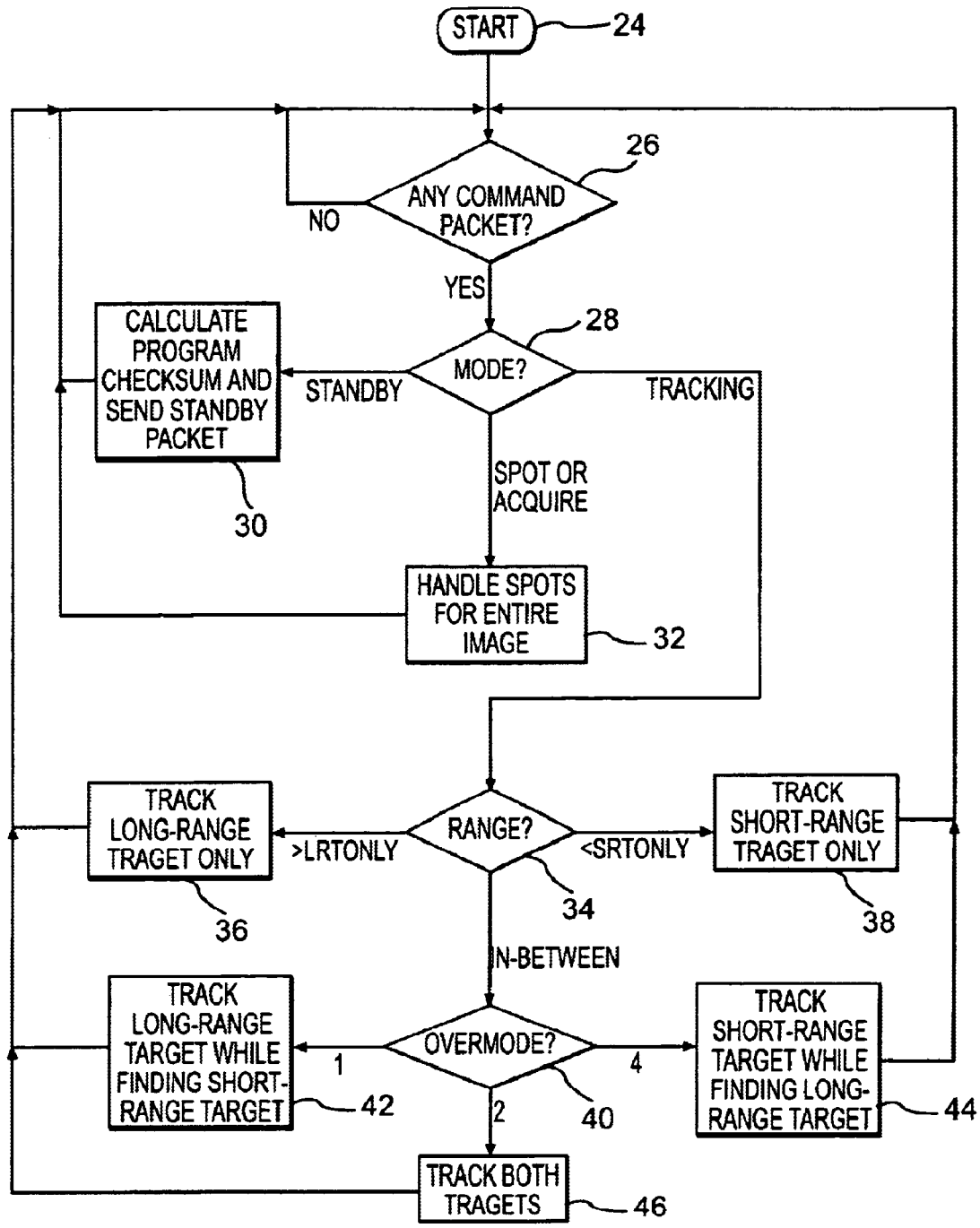
FIG. 3 is the main flowchart for the image processor of the system.

Referring to FIG. 3, there is shown the main flowchart for the image (C33) processor. As indicated above, the chief function of this processor is to carry out the image processing necessary for some of the commands. As illustrated, from start 24, the process proceeds to a "any command packet?" decision diamond 26 and, if there is a command, to a "mode?" decision diamond 28. As shown, three modes are possible, viz., standby, tracking and spot or acquire.

For the standby mode, the program checksum is calculated and the standby packet is send, as indicated by block 30.

In the spot (spot or acquire) mode, spots for the entire image are processed ("handled"), as indicated by block 32, and in a manner generally as described above in the introductory portion of this patent application.

In the tracking mode, a "range?" decision diamond 34 has its output routed to one of a long-range target tracking operation, indicated by block 36, a short-range target racking operation, indicated by block 38 and "in-between" operation, which routes the output to an "overmode?" decision diamond 40. The latter provides three possibilities, viz., tracking of a long-range while finding a short-range target, as indicated by block 42, tracking a short-range target while finding a long-range target, indicated by block 44, and tracking both targets, indicated by block 46.

Although the invention has been described above in relation to preferred embodiments thereof, it will be understood by those skilled in the art that variations and modifications can be effected in these preferred embodiments without departing from the scope and spirit of the invention.

What is claimed is:

1. A method for controlling operations in a video guidance sensor system wherein images of laser output signals transmitted by the system and returned from a target are captured and processed by the system to produce data used in tracking of the target, said target including a predetermined pattern of light reflectors so that a captured image of the target includes a pattern of light spots corresponding to the pattern of light reflectors, said method providing for performance of each of the following modes of operation in response to a corresponding mode command:

(i) a reset mode wherein program integrity checks are performed and an output produced;
   (ii) a diagnostic mode wherein diagnostic operations are carried out and a known output is obtained from captured images of a previously synthesized image;
   (iii) a standby mode wherein status data is output at a fixed rate;
   (iv) an acquisition mode wherein range information is included in a corresponding acquisition mode command and an attempt is made, based on captured images of returned laser signals, to find a target pattern within a range window centered around an estimated range;
   (v) a tracking mode wherein images of a target are captured and data relevant to that target is output; and
   (vi) a spot mode wherein captured images of returned laser signals are processed to produce data for all spots found in the image, and the method providing for automatic transition to the standby mode from said reset mode after said integrity checks are performed and from said diagnostic mode to said reset mode after said diagnostic operations are carried out, and said method permitting acceptance of acquisition, spot, reset and diagnostic commands only when the system is in the standby mode, and said method further providing for automatic transition from said acquisition mode to the tracking mode when an acceptable target is found.

2. A method according to claim 1 wherein two different rates of tracking are provided in the tracking mode, and the tracking rate to be used is determined as part of an acquisition mode command.

3. A method according to claim 1 wherein two different rates of tracking are provided in the tracking mode, and the tracking rate to be used is determined based on a separate tracking command.

4. A method according to claim 1 wherein entry into the reset mode is limited to one of (i) powering up the video guidance sensor system and (ii) the system undergoing a soft reboot.

5. A method according to claim 1 wherein in each of said modes an output is produced which includes analog data corresponding to temperature and voltage levels of system hardware.

6. A method according to claim 1 wherein the method is carried out using two different digital signal processors or microprocessors.

7. A method according to claim 6 wherein one of said processors receives said mode commands from an external source, processes said commands and passes the commands to the other of said processors and the other of said processors carries out image processing required by some of said commands.

* * * * *